United States Patent
Shaburova et al.

(10) Patent No.: US 11,468,913 B1
(45) Date of Patent: *Oct. 11, 2022

(54) METHOD FOR REAL-TIME VIDEO PROCESSING INVOLVING RETOUCHING OF AN OBJECT IN THE VIDEO

(71) Applicant: Snap Inc., Santa Monica, CA (US)

(72) Inventors: Elena Shaburova, Castro Valley, CA (US); Victor Shaburov, Castro Valley, CA (US)

(73) Assignee: Snap Inc., Santa Monica, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/548,279

(22) Filed: Aug. 22, 2019

Related U.S. Application Data

(63) Continuation of application No. 14/314,334, filed on Jun. 25, 2014, now Pat. No. 10,438,631.

(Continued)

(51) Int. Cl.
G06K 9/46 (2006.01)
G06T 5/00 (2006.01)
(Continued)

(52) U.S. Cl.
CPC ............ *G11B 27/031* (2013.01); *G06F 3/011* (2013.01); *G06N 20/00* (2019.01); *G06T 5/005* (2013.01);
(Continued)

(58) Field of Classification Search
None
See application file for complete search history.

(56) References Cited

U.S. PATENT DOCUMENTS 4,888,713 A 12/1989 Falk
5,359,706 A 10/1994 Sterling
(Continued)

FOREIGN PATENT DOCUMENTS

CA 2887596 A1 7/2015
KR 100853122 B1 8/2008

OTHER PUBLICATIONS

Phadke et al., "Illumination invariant Mean-shift tracking," 2013 IEEE Workshop on Applications of Computer Vision (WACV), 2013, pp. 407-412, doi: 10.1109/WACV.2013.6475047 (Year: 2013).*

(Continued)

*Primary Examiner* — Feng Niu
(74) *Attorney, Agent, or Firm* — Schwegman Lundberg & Woessner, P.A.

(57) ABSTRACT

Method for real time video processing for retouching an object in a video, comprising: providing an object in the video steam, the object being at least partially and at least occasionally presented in frames of the video; setting a degree of retouching; generating a list of at least one element of the object selected based on a request of retouching and the degree of retouching; detecting the at least one element of the object in the video and parameters of the at least one element; calculating new parameters of the at least one element according to the degree of retouching; detecting characteristic points for each of the at least one element of the object; generating a mesh based on the characteristic points for each of the at least one element of the object; tracking the at least one element of the object in the video, wherein the tracking comprises aligning the mesh for each of the at least one element with a position of the corresponding each of the at least one element; and transforming the frames of the video such that the at least one element of the (Continued)

object is modified by the application of the new parameters to the at least one element of the object using the mesh.

19 Claims, 7 Drawing Sheets

Related U.S. Application Data

(60) Provisional application No. 61/936,016, filed on Feb. 5, 2014.

(51) Int. Cl.

| | | |
|---|---|---|
| *G11B 27/031* | (2006.01) | |
| *G06T 13/40* | (2011.01) | |
| *G06T 19/20* | (2011.01) | |
| *G06F 3/01* | (2006.01) | |
| *H04N 5/262* | (2006.01) | |
| *G06T 11/60* | (2006.01) | |
| *H04N 9/79* | (2006.01) | |
| *G06T 7/33* | (2017.01) | |
| *G06T 7/246* | (2017.01) | |
| *G06T 7/90* | (2017.01) | |
| *G06T 11/00* | (2006.01) | |
| *G06N 20/00* | (2019.01) | |
| *G06T 17/20* | (2006.01) | |
| *G06V 10/40* | (2022.01) | |
| *G06V 10/42* | (2022.01) | |
| *G06V 10/56* | (2022.01) | |
| *G06V 10/60* | (2022.01) | |
| *G06V 20/40* | (2022.01) | |
| *G06V 40/20* | (2022.01) | |
| *G06V 40/16* | (2022.01) | |
| *G06V 10/46* | (2022.01) | |

(52) U.S. Cl.
CPC ............ *G06T 7/246* (2017.01); *G06T 7/251* (2017.01); *G06T 7/33* (2017.01); *G06T 7/90* (2017.01); *G06T 11/001* (2013.01); *G06T 11/60* (2013.01); *G06T 13/40* (2013.01); *G06T 17/20* (2013.01); *G06T 19/20* (2013.01); *G06V 10/40* (2022.01); *G06V 10/42* (2022.01); *G06V 10/56* (2022.01); *G06V 10/60* (2022.01); *G06V 20/40* (2022.01); *G06V 20/46* (2022.01); *G06V 40/167* (2022.01); *G06V 40/168* (2022.01); *G06V 40/171* (2022.01); *G06V 40/174* (2022.01); *G06V 40/20* (2022.01); *H04N 5/262* (2013.01); *H04N 9/79* (2013.01); *G06T 2207/10016* (2013.01); *G06T 2207/10021* (2013.01); *G06T 2207/10024* (2013.01); *G06T 2207/20036* (2013.01); *G06T 2207/30201* (2013.01); *G06V 10/467* (2022.01)

(56) References Cited

U.S. PATENT DOCUMENTS

| | | | |
|---|---|---|---|
| 5,479,603 A | | 12/1995 | Stone et al. |
| 5,990,973 A | * | 11/1999 | Sakamoto ................. G06T 7/90 |
| | | | 348/576 |
| 6,016,150 A | * | 1/2000 | Lengyel ................ G06T 11/001 |
| | | | 345/589 |
| 6,038,295 A | | 3/2000 | Mattes |
| 6,252,576 B1 | | 6/2001 | Nottingham |
| 6,278,491 B1 | * | 8/2001 | Wang ........................ G06T 5/005 |
| | | | 348/370 |
| H2003 H | | 11/2001 | Minner |
| 6,492,986 B1 | * | 12/2002 | Metaxas ................. G06V 40/20 |
| | | | 345/474 |
| 6,621,939 B1 | | 9/2003 | Negishi et al. |
| 6,768,486 B1 | | 7/2004 | Szabo et al. |
| 6,771,303 B2 | * | 8/2004 | Zhang ..................... H04N 7/144 |
| | | | 382/118 |
| 6,806,898 B1 | * | 10/2004 | Toyama ................. H04N 7/144 |
| | | | 348/14.08 |
| 6,807,290 B2 | | 10/2004 | Liu et al. |
| 6,891,549 B2 | | 5/2005 | Gold |
| 6,897,977 B1 | | 5/2005 | Bright |
| 6,980,909 B2 | | 12/2005 | Root et al. |
| 7,034,820 B2 | | 4/2006 | Urisaka et al. |
| 7,039,222 B2 | | 5/2006 | Simon et al. |
| 7,119,817 B1 | | 10/2006 | Kawakami |
| 7,167,519 B2 | | 1/2007 | Comaniciu et al. |
| 7,173,651 B1 | | 2/2007 | Knowles |
| 7,212,656 B2 | | 5/2007 | Liu et al. |
| 7,227,567 B1 | | 6/2007 | Beck et al. |
| 7,239,312 B2 | | 7/2007 | Urisaka et al. |
| 7,411,493 B2 | | 8/2008 | Smith |
| 7,535,890 B2 | | 5/2009 | Rojas |
| 7,538,764 B2 | | 5/2009 | Salomie |
| 7,564,476 B1 | | 7/2009 | Coughlan et al. |
| 7,671,318 B1 | | 3/2010 | Tener et al. |
| 7,697,787 B2 | | 4/2010 | Illsley |
| 7,782,506 B2 | | 8/2010 | Suzuki et al. |
| 7,812,993 B2 | | 10/2010 | Bright |
| 7,945,653 B2 | | 5/2011 | Zuckerberg et al. |
| 7,971,156 B2 | | 6/2011 | Albertson et al. |
| 8,026,931 B2 | * | 9/2011 | Sun .......................... G06T 11/00 |
| | | | 345/632 |
| 8,086,060 B1 | | 12/2011 | Gilra et al. |
| 8,090,160 B2 | * | 1/2012 | Kakadiaris ............ G06V 40/172 |
| | | | 382/285 |
| 8,131,597 B2 | | 3/2012 | Hudetz |
| 8,199,747 B2 | | 6/2012 | Rojas et al. |
| 8,230,355 B1 | | 7/2012 | Bauermeister et al. |
| 8,253,789 B2 | | 8/2012 | Aizaki et al. |
| 8,295,557 B2 | | 10/2012 | Wang et al. |
| 8,296,456 B2 | | 10/2012 | Klappert |
| 8,314,842 B2 | | 11/2012 | Kudo |
| 8,332,475 B2 | | 12/2012 | Rosen et al. |
| 8,335,399 B2 | | 12/2012 | Gyotoku |
| 8,385,684 B2 | * | 2/2013 | Sandrew ............... H04N 13/266 |
| | | | 382/284 |
| 8,520,093 B2 | * | 8/2013 | Nanu ..................... H04N 1/624 |
| | | | 382/167 |
| 8,675,972 B2 | * | 3/2014 | Lefevre ................. G06T 19/006 |
| | | | 382/216 |
| 8,717,465 B2 | | 5/2014 | Ning |
| 8,718,333 B2 | | 5/2014 | Wolf et al. |
| 8,724,622 B2 | | 5/2014 | Rojas |
| 8,743,210 B2 | | 6/2014 | Lin |
| 8,761,497 B2 | | 6/2014 | Berkovich et al. |
| 8,766,983 B2 | | 7/2014 | Marks et al. |
| 8,810,696 B2 | | 8/2014 | Ning |
| 8,823,769 B2 | * | 9/2014 | Sekine ..................... H04N 7/15 |
| | | | 348/14.16 |
| 8,824,782 B2 | * | 9/2014 | Ichihashi .................. G06T 5/50 |
| | | | 382/159 |
| 8,874,677 B2 | | 10/2014 | Rosen et al. |
| 8,897,596 B1 | * | 11/2014 | Passmore ............ H04N 13/257 |
| | | | 382/284 |
| 8,909,679 B2 | | 12/2014 | Root et al. |
| 8,929,614 B2 | | 1/2015 | Oicherman et al. |
| 8,976,862 B2 | | 3/2015 | Kim et al. |
| 8,995,433 B2 | | 3/2015 | Rojas |
| 9,040,574 B2 | | 5/2015 | Wang et al. |
| 9,055,416 B2 | | 6/2015 | Rosen et al. |
| 9,100,806 B2 | | 8/2015 | Rosen et al. |
| 9,100,807 B2 | | 8/2015 | Rosen et al. |
| 9,191,776 B2 | | 11/2015 | Root et al. |
| 9,204,252 B2 | | 12/2015 | Root |
| 9,225,897 B1 | | 12/2015 | Sehn et al. |
| 9,232,189 B2 | | 1/2016 | Shaburov et al. |
| 9,276,336 B2 | | 3/2016 | Samaranayake |
| 9,311,534 B2 | * | 4/2016 | Liang ..................... G06T 7/248 |

(56) References Cited

U.S. PATENT DOCUMENTS

| | | | |
|---|---|---|---|
| 9,364,147 B2 | 6/2016 | Wakizaka et al. | |
| 9,396,525 B2 | 7/2016 | Shaburova et al. | |
| 9,412,007 B2* | 8/2016 | Nanu | H04N 5/2354 |
| 9,443,227 B2 | 9/2016 | Evans et al. | |
| 9,489,661 B2 | 11/2016 | Evans et al. | |
| 9,491,134 B2 | 11/2016 | Rosen et al. | |
| 9,565,362 B2 | 2/2017 | Kudo | |
| 9,705,331 B2 | 7/2017 | Spiegel | |
| 9,742,713 B2 | 8/2017 | Spiegel et al. | |
| 9,848,293 B2* | 12/2017 | Murray | G01S 5/0027 |
| 9,928,874 B2 | 3/2018 | Shaburova | |
| 10,102,423 B2 | 10/2018 | Shaburov et al. | |
| 10,255,948 B2 | 4/2019 | Shaburova et al. | |
| 10,271,010 B2 | 4/2019 | Gottlieb | |
| 10,283,162 B2 | 5/2019 | Shaburova et al. | |
| 10,284,508 B1 | 5/2019 | Allen et al. | |
| 10,438,631 B2 | 10/2019 | Shaburova et al. | |
| 10,439,972 B1 | 10/2019 | Spiegel et al. | |
| 10,509,466 B1 | 12/2019 | Miller et al. | |
| 10,514,876 B2 | 12/2019 | Sehn | |
| 10,566,026 B1 | 2/2020 | Shaburova | |
| 10,586,570 B2 | 3/2020 | Shaburova et al. | |
| 10,614,855 B2 | 4/2020 | Huang | |
| 10,748,347 B1 | 8/2020 | Li et al. | |
| 10,950,271 B1 | 3/2021 | Shaburova et al. | |
| 10,958,608 B1 | 3/2021 | Allen et al. | |
| 10,962,809 B1 | 3/2021 | Castañeda | |
| 10,991,395 B1 | 4/2021 | Shaburova et al. | |
| 10,996,846 B2 | 5/2021 | Robertson et al. | |
| 10,997,787 B2 | 5/2021 | Ge et al. | |
| 11,012,390 B1 | 5/2021 | Al Majid et al. | |
| 11,030,454 B1 | 6/2021 | Xiong et al. | |
| 11,036,368 B1 | 6/2021 | Al Majid et al. | |
| 11,062,498 B1 | 7/2021 | Voss et al. | |
| 11,087,728 B1 | 8/2021 | Canberk et al. | |
| 11,092,998 B1 | 8/2021 | Castañeda et al. | |
| 11,106,342 B1 | 8/2021 | Al Majid et al. | |
| 11,126,206 B2 | 9/2021 | Meisenholder et al. | |
| 11,143,867 B2 | 10/2021 | Rodriguez, II | |
| 11,169,600 B1 | 11/2021 | Canberk et al. | |
| 11,227,626 B1 | 1/2022 | Krishnan Gorumkonda et al. | |
| 2001/0004417 A1* | 6/2001 | Narutoshi | G11B 27/031 |
| | | | 386/290 |
| 2002/0012454 A1 | 1/2002 | Liu et al. | |
| 2002/0163516 A1* | 11/2002 | Hubbell | G06T 15/50 |
| | | | 345/592 |
| 2003/0107568 A1 | 6/2003 | Urisaka et al. | |
| 2003/0132946 A1 | 7/2003 | Gold | |
| 2003/0228135 A1 | 12/2003 | Illsley | |
| 2004/0119662 A1 | 6/2004 | Dempski | |
| 2004/0130631 A1 | 7/2004 | Suh | |
| 2004/0233223 A1 | 11/2004 | Schkolne et al. | |
| 2005/0046905 A1 | 3/2005 | Aizaki et al. | |
| 2005/0117798 A1 | 6/2005 | Patton | |
| 2005/0128211 A1 | 6/2005 | Berger et al. | |
| 2005/0180612 A1 | 8/2005 | Nagahashi et al. | |
| 2005/0190980 A1 | 9/2005 | Bright | |
| 2005/0202440 A1 | 9/2005 | Fletterick et al. | |
| 2005/0238217 A1 | 10/2005 | Enomoto et al. | |
| 2006/0098248 A1 | 5/2006 | Suzuki et al. | |
| 2006/0110004 A1* | 5/2006 | Wu | G06F 21/84 |
| | | | 382/232 |
| 2006/0170937 A1 | 8/2006 | Takahashi | |
| 2006/0227997 A1 | 10/2006 | Au et al. | |
| 2006/0269128 A1* | 11/2006 | Vladislav | H04N 1/624 |
| | | | 382/167 |
| 2006/0290695 A1 | 12/2006 | Salomie | |
| 2007/0013709 A1 | 1/2007 | Charles et al. | |
| 2007/0140556 A1 | 6/2007 | Willamowski et al. | |
| 2007/0159551 A1 | 7/2007 | Kotani | |
| 2007/0216675 A1* | 9/2007 | Sun | G06T 11/00 |
| | | | 345/419 |
| 2007/0223830 A1* | 9/2007 | Ono | G06V 40/168 |
| | | | 382/254 |
| 2007/0258656 A1 | 11/2007 | Aarabi et al. | |
| 2007/0268312 A1 | 11/2007 | Marks et al. | |
| 2008/0063285 A1* | 3/2008 | Porikli | G06K 9/6257 |
| | | | 382/190 |
| 2008/0184153 A1 | 7/2008 | Matsumura et al. | |
| 2008/0212894 A1 | 9/2008 | Demirli et al. | |
| 2009/0027732 A1* | 1/2009 | Imai | G06T 5/00 |
| | | | 358/3.27 |
| 2009/0158170 A1 | 6/2009 | Narayanan et al. | |
| 2009/0290791 A1* | 11/2009 | Holub | G06V 20/40 |
| | | | 382/164 |
| 2009/0310828 A1 | 12/2009 | Kakadiaris et al. | |
| 2010/0074475 A1* | 3/2010 | Chouno | G06V 10/245 |
| | | | 382/218 |
| 2010/0177981 A1 | 7/2010 | Wang et al. | |
| 2010/0188497 A1 | 7/2010 | Aizaki et al. | |
| 2010/0202697 A1* | 8/2010 | Matsuzaka | G06V 40/168 |
| | | | 382/209 |
| 2010/0203968 A1* | 8/2010 | Gill | H04L 67/38 |
| | | | 463/32 |
| 2010/0231590 A1* | 9/2010 | Erceis | G06T 15/04 |
| | | | 345/426 |
| 2010/0316281 A1* | 12/2010 | Lefevre | G06T 7/75 |
| | | | 382/154 |
| 2011/0018875 A1 | 1/2011 | Arahari et al. | |
| 2011/0182357 A1 | 7/2011 | Kim et al. | |
| 2011/0202598 A1 | 8/2011 | Evans et al. | |
| 2011/0261050 A1* | 10/2011 | Smolic | G06T 15/20 |
| | | | 345/419 |
| 2011/0273620 A1 | 11/2011 | Berkovich et al. | |
| 2012/0106806 A1 | 5/2012 | Folta et al. | |
| 2012/0144325 A1 | 6/2012 | Mital et al. | |
| 2012/0167146 A1 | 6/2012 | Incorvia | |
| 2012/0209924 A1 | 8/2012 | Evans et al. | |
| 2012/0288187 A1* | 11/2012 | Ichihashi | G06T 5/002 |
| | | | 382/159 |
| 2012/0306853 A1 | 12/2012 | Wright et al. | |
| 2013/0004096 A1 | 1/2013 | Goh et al. | |
| 2013/0190577 A1 | 7/2013 | Brunner et al. | |
| 2013/0201105 A1 | 8/2013 | Ptucha et al. | |
| 2013/0201187 A1 | 8/2013 | Tong et al. | |
| 2013/0201328 A1* | 8/2013 | Chung | G06T 5/005 |
| | | | 348/143 |
| 2013/0208129 A1 | 8/2013 | Stenman | |
| 2013/0229409 A1 | 9/2013 | Song et al. | |
| 2013/0278600 A1* | 10/2013 | Christensen | G06T 19/20 |
| | | | 345/420 |
| 2013/0287291 A1 | 10/2013 | Cho | |
| 2014/0043329 A1 | 2/2014 | Wang et al. | |
| 2014/0179347 A1* | 6/2014 | Murray | H04W 4/021 |
| | | | 455/456.1 |
| 2014/0198177 A1* | 7/2014 | Castellani | G06T 11/00 |
| | | | 348/43 |
| 2014/0228668 A1 | 8/2014 | Wakizaka et al. | |
| 2015/0055829 A1* | 2/2015 | Liang | G06T 7/248 |
| | | | 382/103 |
| 2015/0097834 A1 | 4/2015 | Ma et al. | |
| 2015/0116350 A1* | 4/2015 | Lin | G06T 11/60 |
| | | | 345/620 |
| 2015/0116448 A1 | 4/2015 | Gottlieb | |
| 2015/0131924 A1 | 5/2015 | He et al. | |
| 2015/0145992 A1 | 5/2015 | Traff | |
| 2015/0163416 A1 | 6/2015 | Nevatie | |
| 2015/0195491 A1 | 7/2015 | Shaburov et al. | |
| 2015/0213604 A1 | 7/2015 | Li et al. | |
| 2015/0221069 A1 | 8/2015 | Shaburova et al. | |
| 2015/0221118 A1 | 8/2015 | Shaburova | |
| 2015/0221136 A1 | 8/2015 | Shaburova et al. | |
| 2015/0221338 A1 | 8/2015 | Shaburova et al. | |
| 2015/0222821 A1 | 8/2015 | Shaburova | |
| 2016/0012627 A1* | 1/2016 | Kishikawa | G06T 17/05 |
| | | | 345/419 |
| 2016/0253550 A1* | 9/2016 | Zhang | G06V 40/171 |
| | | | 382/203 |
| 2016/0322079 A1 | 11/2016 | Shaburova et al. | |
| 2017/0098122 A1 | 4/2017 | El Kaliouby et al. | |
| 2018/0364810 A1 | 12/2018 | Parshionikar | |
| 2020/0160886 A1 | 5/2020 | Shaburova | |

(56) References Cited

U.S. PATENT DOCUMENTS

| | | |
|---|---|---|
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |

OTHER PUBLICATIONS

Forlenza et al., "Real time corner detection for miniaturized electro-optical sensors onboard small unmanned aerial systems." Sensors 12, No. 1 (2012): 863-877 (Year: 2012).*

Baldwin et al., "Resolution-appropriate shape representation." In Sixth International Conference on Computer Vision (IEEE Cat. No. 98CH36271), pp. 460-465. IEEE, 1998. (Year: 1998).*

Li et al., "Simultaneous facial feature tracking and facial expression recognition." IEEE Transactions on image processing 22, No. 7 (2013): 2559-2573. (Year: 2013).*

Wikipedia, "Facial Action Coding System", published on Jan. 23, 2014 (Year: 2014).*

Chen et al., "Robust Facial Feature Tracking Under Various Illuminations," 2006 International Conference on Image Processing, 2006, pp. 2829-2832, doi: 10.1109/ICIP.2006.312997. (Year: 2006).*

"U.S. Appl. No. 14/114,124, Response filed Oct. 5, 2016 to Final Office Action dated May 5, 2016", 14 pgs.

"U.S. Appl. No. 14/314,312, Final Office Action dated Apr. 12, 2017", 34 pgs.

"U.S. Appl. No. 14/314,312, Final Office Action dated May 5, 2016", 28 pgs.

"U.S. Appl. No. 14/314,312, Final Office Action dated May 10, 2018", 32 pgs.

"U.S. Appl. No. 14/314,312, Non Final Office Action dated Aug. 30, 2017", 32 pgs.

"U.S. Appl. No. 14/314,312, Non Final Office Action dated Oct. 17, 2016", 33 pgs.

"U.S. Appl. No. 14/314,312, Non Final Office Action dated Nov. 5, 2015", 26 pgs.

"U.S. Appl. No. 14/314,312, Non Final Office Action dated Nov. 27, 2018", 29 pgs.

"U.S. Appl. No. 14/314,312, Response filed Mar. 17, 2017 to Non Final Office Action dated Oct. 17, 2016", 12 pgs.

"U.S. Appl. No. 14/314,312, Response filed Feb. 28, 2018 to Non Final Office Action dated Aug. 30, 2017", 13 pgs.

"U.S. Appl. No. 14/314,312, Response filed Apr. 5, 2016 to Non Final Office Action dated Nov. 5, 2015", 13 pgs.

"U.S. Appl. No. 14/314,312, Response filed Sep. 6, 2018 to Final Office Action dated May 10, 2018", 12 pgs.

"U.S. Appl. No. 14/314,312, Response filed Oct. 5, 2016 to Final Office Action dated May 5, 2016", 12 pgs.

"U.S. Appl. No. 14/314,324, Advisory Action dated Sep. 21, 2017", 4 pgs.

"U.S. Appl. No. 14/314,324, Final Office Action dated May 3, 2017", 33 pgs.

"U.S. Appl. No. 14/314,324, Final Office Action dated May 5, 2016", 24 pgs.

"U.S. Appl. No. 14/314,324, Non Final Office Action dated Oct. 14, 2016", 26 pgs.

"U.S. Appl. No. 14/314,324, Non Final Office Action dated Nov. 5, 2015", 23 pgs.

"U.S. Appl. No. 14/314,324, Notice of dated dated Nov. 8, 2017", 7 pgs.

"U.S. Appl. No. 14/314,324, Response filed Feb. 14, 2017 to Non Final Office Action dated Oct. 14, 2016", 19 pgs.

"U.S. Appl. No. 14/314,324, Response filed Apr. 5, 2016 to Non Final Office Action dated Nov. 5, 2015", 15 pgs.

"U.S. Appl. No. 14/314,324, Response filed Sep. 1, 2017 to Final Office Action dated May 3, 2017", 10 pgs.

"U.S. Appl. No. 14/314,324, Response Filed Oct. 5, 2016 to Final Office Action dated May 5, 2016", 14 pgs.

"U.S. Appl. No. 14/314,324, Response filed Nov. 3, 2017 to Advisory Action dated Sep. 21, 2017", 11 pgs.

"U.S. Appl. No. 14/314,334, Appeal Brief filed Apr. 15, 2019", 19 pgs.

"U.S. Appl. No. 14/314,334, Examiner Interview Summary dated Apr. 28, 2017", 3 pgs.

"U.S. Appl. No. 14/314,334, Examiner Interview Summary dated Nov. 26, 2018", 3 pgs.

"U.S. Appl. No. 14/314,334, Final Office Action dated Feb. 15, 2019", 40 pgs.

"U.S. Appl. No. 14/314,334, Final Office Action dated May 16, 2016", 43 pgs.

"U.S. Appl. No. 14/314,334, Final Office Action dated May 31, 2018", 38 pgs.

"U.S. Appl. No. 14/314,334, Final Office Action dated Jul. 12, 2017", 40 pgs.

"U.S. Appl. No. 14/314,334, Non Final Office Action dated Jan. 22, 2018", 35 pgs.

"U.S. Appl. No. 14/314,334, Non Final Office Action dated Oct. 26, 2018", 39 pgs.

"U.S. Appl. No. 14/314,334, Non Final Office Action dated Nov. 13, 2015", 39 pgs.

"U.S. Appl. No. 14/314,334, Non Final Office Action dated Dec. 1, 2016", 45 pgs.

"U.S. Appl. No. 14/314,334, Notice of Allowance dated Sep. 19, 2017", 5 pgs.

"U.S. Appl. No. 14/314,334, Response filed Apr. 13, 2016 to Non Final Office Action dated Nov. 13, 2015", 20 pgs.

"U.S. Appl. No. 14/314,334, Response Filed Apr. 23, 2018 to Non Final Office Action dated Jan. 22, 2018", 14 pgs.

"U.S. Appl. No. 14/314,334, Response filed May 20, 2017 to Non Final Office Action dated Dec. 1, 2016", 16 pgs.

"U.S. Appl. No. 14/314,334, Response filed Aug. 30, 2018 to Final Office Action dated May 31, 2018", 13 pgs.

"U.S. Appl. No. 14/314,334, Response filed Sep. 1, 2017 to Final Office Action dated Jul. 12, 2017", 12 pgs.

"U.S. Appl. No. 14/314,334, Response filed Oct. 17, 2016 to Final Office Action dated May 16, 2016", 16 pgs.

"U.S. Appl. No. 14/314,343, Final Office Action dated May 6, 2016", 19 pgs.

"U.S. Appl. No. 14/314,343, Final Office Action dated Sep. 6, 2018", 43 pgs.

"U.S. Appl. No. 14/314,343, Non Final Office Action dated Apr. 19, 2018", 40 pgs.

"U.S. Appl. No. 14/314,343, Non Final Office Action dated Nov. 4, 2015", 14 pgs.

"U.S. Appl. No. 14/314,343, Non Final Office Action dated Nov. 17, 2016", 31 pgs.

"U.S. Appl. No. 14/314,343, Response filed Feb. 15, 2018 to Final Office Action dated Aug. 15, 2017", 11 pgs.

"U.S. Appl. No. 14/314,343, Response filed Apr. 4, 2016 to Non Final Office Action dated Nov. 4, 2015", 10 pgs.

"U.S. Appl. No. 14/314,343, Response filed May 11, 2017 to Non Final Office Action dated Nov. 17, 2016", 13 pgs.

"U.S. Appl. No. 14/314,343, Response filed Jul. 19, 2018 to Non Final Office Action dated Apr. 19, 2018", 15 pgs.

"U.S. Appl. No. 14/314,343, Response filed Oct. 6, 2016 to Final Office Action dated May 6, 2016", 13 pgs.

"U.S. Appl. No. 14/314,343, Response Filed Oct. 11, 2018 to Final Office Action dated Sep. 6, 2018", 11 pgs.

"U.S. Appl. No. 14/325,477, Non Final Office Action dated Oct. 9, 2015", 17 pgs.

"U.S. Appl. No. 14/325,477, Notice of Allowance dated Mar. 17, 2016", 5 pgs.

"U.S. Appl. No. 14/325,477, Response filed Feb. 9, 2016 to Non Final Office Action dated Oct. 9, 2015", 13 pgs.

"U.S. Appl. No. 15/208,973, Final Office Action dated May 10, 2018", 13 pgs.

(56) References Cited

OTHER PUBLICATIONS

"U.S. Appl. No. 15/208,973, Non Final Office Action dated Sep. 19, 2017", 17 pgs.

"U.S. Appl. No. 15/208,973, Notice of Allowance dated Nov. 20, 2018", 14 pgs.

"U.S. Appl. No. 15/208,973, Preliminary Amendment filed Jan. 17, 2017", 9 pgs.

"U.S. Appl. No. 15/208,973, Response filed Sep. 5, 2018 to Final Office Action dated May 10, 2018", 10 pgs.

"Imatest", [Online] Retrieved from the Internet on Jul. 10, 2015: <URL: https://web.archive.org/web/20150710000557/http://www.imatest.com/>, 3 pqs.

Ahlberg, Jorgen, "Candide-3: An Updated Parameterised Face", Image Coding Group, Dept. of Electrical Engineering, Linkoping University, SE, (Jan. 2001), 16 pgs.

Baxes, Gregory A., et al., "Digital Image Processing: Principles and Applications, Chapter 4", New York: Wiley, (1994), 88-91.

Chen, et al., "Manipulating, Deforming and Animating Sampled Object Representations", Computer Graphics Forum vol. 26, (2007), 824-852 pgs.

Dornaika, F, et al., "On Appearance Based Face and Facial Action Tracking", IEEE Trans. Circuits Syst. Video Technol. 16(9), (Sep. 2006), 1107-1124.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Milborrow, S, et al., "Locating facial features with an extended active shape model", European Conference on Computer Vision, Springer, Berlin, Heidelberg, [Online] Retrieved from the Internet: <URL: http://www.milbo.org/stasm-files/locating-facial-features-with-an-extended-asm.pdf>, (2008), 11 pgs.

"U.S. Appl. No. 14/314,312, Advisory Action dated May 10, 2019", 3 pgs.

"U.S. Appl. No. 14/314,312, Appeal Brief filed Oct. 3, 2019", 14 pgs.

"U.S. Appl. No. 14/314,312, Final Office Action dated Mar. 22, 2019", 28 pgs.

"U.S. Appl. No. 14/314,312, Notice of Allowability dated Jan. 7, 2020", 3 pgs.

"U.S. Appl. No. 14/314,312, Notice of Allowance dated Oct. 25, 2019", 9 pgs.

"U.S. Appl. No. 14/314,312, Response filed Jan. 28, 2019 to Non Final Office Action dated Nov. 27, 2018", 10 pgs.

"U.S. Appl. No. 14/314,312, Response filed Aug. 14, 2017 to Final Office Action dated Apr. 12, 2017", 16 pgs.

"U.S. Appl. No. 14/314,312, Response filed May 3, 2019 to Final Office Action dated Mar. 22, 2019", 11 pgs.

"U.S. Appl. No. 14/314,343, Final Office Action dated Aug. 15, 2017", 38 pgs.

"U.S. Appl. No. 14/314,343, Notice of Allowance dated Dec. 17, 2018", 5 pgs.

"U.S. Appl. No. 15/208,973, Notice of Allowability dated Feb. 21, 2019", 3 pgs.

"U.S. Appl. No. 15/921,282, Notice of Allowance dated Oct, 2, 2019", 9 pgs.

"U.S. Appl. No. 16/298,721, Non Final Office Action dated Oct. 3, 2019", 40 pgs.

"U.S. Appl. No. 16/298,721, Response filed Jan. 3, 2020 to Non Final Office Action dated Oct. 3,2019", 10 pgs.

"Bilinear interpolation", Wikipedia, [Online] Retrieved from the Internet: <https://web.arehive.org/web/20110921104425/http://en.wikipedia.org/wiki/Bilinear_interpolation>, (Jan. 8, 2014), 3 pgs,.

"KR 10-0853122 B1 machine translation", IP.com, (2008), 29 pgs.

Ohya, Jun, et ai., "Virtual Metamorphosis", IEEE MultiMedia, 6(2), (1999), 29-39.

U.S. Appl. No. 14/314,312, filed Jun. 25, 2014, Method for Real Time Video Processing for Changing Proportions of an Object in the Video.

U.S. Appl. No. 14/325,477 U.S. Pat. No. 9,396,525, filed Jul. 8, 2014, Method for Real Time Video Processing Involving Changing a Color of an Object on a Human Face in a Video.

U.S. Appl. No. 15/203,973 U.S. Pat. No. 10,255,948, filed Jul. 13, 2016, Method for Real Tlme Video Processing Involving Changing a Color of an Object on a Human Face in a Video.

U.S. Appl. No. 16/277,750, filed Feb. 15, 2019, Method for Real Time Video Processing Involving Changing a Color of an Object on a Human Face in a Video.

U.S. Appl. No. 15/921,282, filed Mar. 14, 2018, Method for Real-Time Video Processing Involving Changing Features of an Object in the Video.

U.S. Appl. No. 14/314,324 U.S. Appl. No. 9,928,874, filed Jun. 25, 2014 Method for Real-Time Video Processing Involving Changing Features of an Object in the Video.

U.S. Appl. No. 16/732,858, filed 2, 2020, Method for Real-Time Video Processing Involving Changing Features of an Object in the Video.

U.S. Appl. No. 14/314,334 U.S. Pat. No. 10,438,631, filed Jun. 25, 2014, Method for Real-Time Video Processing Involving Retouchlng of an Object in the Video.

U.S. Appl. No. 14/314,343 U.S. Pat. No. 10,283,162, filed Jun. 25, 2014, Method for Triggering Events in a Video.

U.S. Appl. No. 16/298,721, filed Mar. 11, 2019, Method for Triggering Events in a Video.

"U.S. Appl. No. 16/298,721, Final Office Action dated Mar. 6, 2020", 54 pgs.

"U.S. Appl. No. 16/298,721, Response filed Apr. 23, 2020 to Final Office Action dated Mar. 6, 2020", 11 pgs.

"U.S. Appl. No. 16/298,721, Advisory Action dated May 12, 2020", 3 pgs.

"U.S. Appl. No. 16/298,721, Non Final Office Action dated Jul. 24, 2020", 80 pgs.

"U.S. Appl. No. 16/277,750, Non Final Office Action dated Aug. 5, 2020", 8 pgs.

"U.S. Appl. No. 16/298,721, Examiner Interview Summary dated Oct. 20, 2020", 3 pgs.

"U.S. Appl. No. 16/298,721, Response filed Oct. 22, 2020 to Non Final Office Action dated Jul. 24, 20", 13 pgs.

"U.S. Appl. No. 16/277,750, Response filed Nov. 5, 2020 to Non Final Office Action dated Aug. 5, 2020", 27 pgs.

"U.S. Appl. No. 16/298,721, Notice of Allowance dated Nov. 10, 2020", 5 pgs.

"U.S. Appl. No. 16/277,750, Notice of Allowance dated Nov. 30, 2020", 5 pgs.

"U.S. Appl. No. 16/277,750, PTO Response to Rule 312 Communication dated Mar. 30, 2021", 2 pgs.

"U.S. Appl. No. 16/277,750, Supplemental Notice of Allowability dated Dec. 28, 2020", 2 pgs.

"U.S. Appl. No. 16/298,721, PTO Response to Rule 312 Communication dated Feb. 4, 2021", 2 pgs.

U.S. Appl. No. 17/248,812, filed Feb. 9, 2021, Method for Triggering Events in a video.

"U.S. Appl. No. 16/732,858, Non Final Office Action dated Jul. 19, 2021", 29 pgs.

Neoh, Hong Shan, et al., "Adaptive Edge Detection for Real-Time Video Processing using FPGAs", Global Signal Processing, vol. 7. No. 3, (2004), 7 pgs.

Tchoulack, Stephane, et al., "A Video Stream Processor for Real-time Detection and Correction of Specular Reflections in Endoscopic Images", 2008 Joint 6th International IEEE Northeast Workshop on Circuits and Systems and TAISA Conference, (2008), 49-52.

"U.S. Appl. No. 16/732,858, Response filed Oct. 19, 2021 to Non Final Office Action dated Jul. 19, 2021", 12 pgs.

"U.S. Appl. No. 16/749,708, Non Final Office Action dated Jul. 30, 2021", 29 pgs.

"U.S. Appl. No. 16/749,708, Response filed Oct. 28, 2021 to Non Final Office Action dated Jul. 30, 2021", 12 pgs.

"U.S. Appl. No. 16/732,858, Advisory Action dated Jan. 12, 2022", 3 pgs.

"U.S. Appl. No. 16/732,858, Final Office Action dated Nov. 4, 2021", 19 pgs.

(56) References Cited

OTHER PUBLICATIONS

"U.S. Appl. No. 16/732,858, Response filed Jan. 3, 2022 to Final Office Action dated Nov. 4, 2021", 10 pgs.

"U.S. Appl. No. 16/749,708, Final Office Action dated Nov. 15, 2021", 35 pgs.

"U.S. Appl. No. 16/749,708, Notice of Allowance dated Jan. 21, 2022", 13 pgs.

"U.S. Appl. No. 16/749,708, Response filed Jan. 7, 2022 to Final Office Action dated Nov. 15, 2021", 11 pgs.

"U.S. Appl. No. 17/248,812, Non Final Office Action dated Nov. 22, 2021", 39 pgs.

Florenza, Lidia, et al., "Real Time Corner Detection for Miniaturized Electro-Optical Sensors Onboard Small Unmanned Aerial Systems", Sensors, 12(1), (2012), 863-877.

Kaufmann, Peter, et al., "Finite Element Image Warping", Computer Graphics Forum, vol. 32, No. 2-1, Oxford, UK: Blackwell Publishing Ltd., (2013), 31-39.

Phadke, Gargi, et al., "Illumination Invariant Mean-Shift Tracking", 2013 IEEE Workshop on Applications of Computer Vision (WACV), doi: 10.1109/WACV.2013.6475047, (2013), 407-412.

Salmi, Jussi, et al., "Hierarchical grid transformation for image warping in the analysis of two-dimensional electrophoresis gels", Proteomics, 2(11), (2002), 1504-1515.

"U.S. Appl. No. 16/732,858, Non Final Office Action dated Feb. 9, 2022", 26 pgs.

"U.S. Appl. No. 16/732,858, Response filed May 9, 2022 to Non Final Office Action dated Feb. 9, 2022", 11 pgs.

"U.S. Appl. No. 16/749,708, Notice of Allowance dated May 13, 2022", 5 pgs.

"U.S. Appl. No. 17/248,812, Notice of Allowance dated Mar. 23, 2022", 5 pgs.

"U.S. Appl. No. 17/248,812, Response filed Feb. 18, 2022 to Non Final Office Action dated Nov. 22, 2021", 12 pgs.

"Facial Action Coding System", Wikipedia, [Online], Retrieved from the Internet: <URL: https://en.wikipedia.org/w/index.php?title=Facial_Action_Coding_System&oldid=591978414>, (Jan. 23, 2014), 6 pgs.

Baldwin, Bernard, et al., "Resolution-Appropriate Shape Representation", Sixth International Conference on Computer Vision (IEEE Cat. No. 98CH36271), (1998), 460-465.

Lefevre, Stephanie, et al., "Structure and Appearance Features for Robust 3D Facial Actions Tracking", 2009 IEEE International Conference on Multimedia and Expo, (2009), 298-301.

Su, Zihua, "Statistical Shape Modelling: Automatic Shape Model Building", Submitted to the University College London for the Degree of Doctor of Philosophy, (2011), 238 pgs.

"U.S. Appl. No. 16/732,858, Notice of Allowance dated May 31, 2022", 12 pgs.

Chen, Jingying, "Robust Facial Feature Tracking Under Various Illuminations", 2006 International Conference on Image Processing, doi: 10.1109 ICIP.2006.312997., (2006), 2829-2832.

\* cited by examiner

METHOD FOR REAL-TIME VIDEO PROCESSING INVOLVING RETOUCHING OF AN OBJECT IN THE VIDEO

CROSS-REFERENCE TO RELATED APPLICATIONS

This application is a continuation of and claims the benefit of priority of U.S. application Ser. No. 14/314,334, filed Jun. 25, 2014, which claims the benefit of U.S. Provisional Application No. 61/936,016, filed on Feb. 28, 2014, the benefit of priority of each of which is hereby claimed herein, and which applications are hereby incorporated herein by reference in their entireties.

BACKGROUND OF THE INVENTION

Technical Field

The disclosed embodiments relate generally to the field of real-time video processing. In particular, present invention relates to a computerized system and a computer-implemented method of real-time video processing that involves retouching an object in a video.

Description of the Related Art

At the present time some programs can provide processing of still images. For example, U.S. Patent Application Publication No. US2007268312, incorporated herein by reference, discloses a method of replacing face elements by some components that is made by users for real-time video. However, it is not possible to process real time video in such a way that an object shown in real time video can be retouched in real time naturally.

Thus, new and improved systems and methods are needed that would enable real time video processing that involves retouching an object in the video.

SUMMARY OF INVENTION

The embodiments described herein are directed to systems and methods that substantially obviate one or more of the above and other problems associated with the conventional technology for real time video processing.

In accordance with one aspect of the embodiments described herein, there is provided a computer implemented method for real time video processing for retouching an object in a video, the method comprising: providing an object in the video steam, the object being at least partially and at least occasionally presented in frames of the video; setting a degree of retouching; generating a list of at least one element of the object selected based on a request of retouching and the degree of retouching; detecting the at least one element of the object in the video and parameters of the at least one element; calculating new parameters of the at least one element according to the degree of retouching; detecting characteristic points for each of the at least one element of the object; generating a mesh based on the characteristic points for each of the at least one element of the object; tracking the at least one element of the object in the video, wherein the tracking comprises aligning the mesh for each of the at least one element with a position of the corresponding each of the at least one element; and transforming the frames of the video such that the at least one element of the object is modified by the application of the new parameters to the at least one element of the object using the mesh In one or more embodiments, the parameters of the at least one element of the object include its location, shape, color, and properties of a covering layer.

In one or more embodiments, applying the new parameters to the at least one element of the object using the mesh includes: generating a set of first points on the mesh for each of the at least one element of the object based on the actual location of the at least one element; generating a set of second points on the mesh based on the request for retouching; changing location of the at least one element of the object in accordance with the set of first points and the set of second points; and modifying the surrounding area which surrounds the at least one element to avoid distortion of the surrounding area.

In one or more embodiments, applying the new parameters to the at least one element of the object using the mesh includes; generating a set of first points on the mesh for each of the at least one element of the object based on the degree of retouching; generating a set of second points on the mesh based on the set of first points and the degree of retouching; and changing proportions of the at least one element of the object in accordance with the degree of retouching, the set of first points and the set of second points, wherein, for each of the at least one element of the object, the set of first points comes into the set of second points using the mesh.

In one or more embodiments, applying the new parameters to the at least one element of the object using the mesh includes: generating a set of first points on the mesh for each of the at least one element of the object based on the degree of retouching; generating at least one area based on the set of first points for each of the at least one element of the object; and changing color of the at least one area based on the degree of retouching.

In one or more embodiments, applying the new parameters to the at least one element of the object using the mesh includes: generating a set of first points on the mesh for each of the at least one element of the object based on the degree of retouching; generating a covering layer based on the set of first points and the calculated new parameters of the at least one element for each of the at least one element of the object; and applying the generated covering layer to each of the at least one element of the object based on the degree of retouching.

In one or more embodiments, transforming the frames of the video includes: scanning the at least one element of the object in at least two successive frames; generating a ratio of change of the at least one element of the object; and adjusting modification of the at least one element based on the ratio of change of the at least one element.

In one or more embodiments, the object in the video to be retouched is a human face.

In one or more embodiments, the method comprising: detecting parts of the human face which are selected based on the request for retouching; calculating new parameters for the selected parts of the human face to make the parts of the human face be symmetrical relative to the central axis of the human face.

In one or more embodiments, the computer implemented method further comprises: creating a square grid associated with a background of the human face in the video; and transforming the background of the human face using the square grid to achieve blurring of the background.

In one or more embodiments, the processed video comprises a video stream.

In accordance with one aspect of the embodiments described herein, there is provided a computer implemented method of real time video processing for retouching an object in a video, the method comprising: receiving a request for retouching of an object, the object being at least partially and at least occasionally presented in frames of the video; setting a degree of retouching; generating an average image of the object based on a plurality of frames of the video and detecting feature reference points of the object; generating a list of at feast one element of the object selected based on the request of retouching and the degree of retouching; detecting the at least one element of the object in the video and parameters of the at least one element; calculating new parameters of the at least one element according to the degree of retouching; calculating characteristic points for each of the at least one element of the object; generating a first mesh based on the characteristic points for each of the at least one element of the object; generating a covering layer based on the average image of the object and the calculated new parameters of the at least one element, wherein the covering layer comprises the average image with the at least one element of the object modified by the application of the calculated new parameters using the first mesh; tracking the feature reference points of the object in the video, wherein the tracking comprises creating a second mesh that is based on the positions of the feature reference points of the object, and aligning the second mesh to the object in each frame; transforming the covering layer based on the second mesh in each frame; aligning the covering layer with the object using the second mesh; transforming the frames of the video such that the object is covered by the covering layer in each frame.

In accordance with one aspect of the embodiments described herein, there is provided a mobile computerized system comprising a central processing unit and a memory, the memory storing instructions for: receiving providing an object in the video steam, the object being at least partially and at least occasionally presented in frames of the video; setting a degree of retouching; generating a list of at least one element of the object selected based on a request of retouching and the degree of retouching; detecting the at least one element of the object in the video and parameters of the at least one element; calculating new parameters of the at least one element according to the degree of retouching; detecting characteristic points for each of the at least one element of the object; generating a mesh based on the characteristic points for each of the at least one element of the object; tracking the at least one element of the object in the video, wherein the tracking comprises aligning the mesh for each of the at least one element with a position of the corresponding each of the at least one element; transforming the frames of the video such that the at least one element of the object is modified by the application of the new parameters to the at least one element of the object using the mesh.

In one or more embodiments, the parameters of the at least one element of the object include its location, shape, color, and properties of a covering layer.

In one or more embodiments, applying the new parameters to the at least one element of the object using the mesh includes: generating a set of first points on the mesh for each of the at least one element of the object based on the actual location of the at least one element; generating a set of second points on the mesh based on the request for retouching; changing location of the at least one element of the object in accordance with the set of first points and the set of second points; and modifying the surrounding area which surrounds the at least one element to avoid distortion of the surrounding area.

In one or more embodiments, applying the new parameters to the at least one element of the object using the mesh includes: generating a set of first points on the mesh for each of the at least one element of the object based on the degree of retouching; generating a set of second points on the mesh based on the set of first points and the degree of retouching; and changing proportions of the at least one element of the object in accordance with the degree of retouching, the set of first points and the set of second points, wherein, for each of the at least one element of the object, the set of first points comes into the set of second points using the mesh.

In one or more embodiments, applying the new parameters to the at least one element of the object using the mesh includes: generating a set of first points on the mesh for each of the at least one element of the object based on the degree of retouching; generating at least one area based on the set of first points for each of the at least one element of the object; and changing color of the at least one area based on the degree of retouching.

In one or more embodiments, applying the new parameters to the at least one element of the object using the mesh includes: generating a set of first points on the mesh for each of the at least one element of the object based on the degree of retouching; generating a covering layer based on the set of first points and the calculated new parameters of the at least one element for each of the at least one element of the object; and applying the generated covering layer to each of the at least one element of the object based on the degree of retouching.

In one or more embodiments, transforming the frames of the video includes: scanning the at least one element of the object in at least two successive frames; generating a ratio of change of the at least one element of the object; and adjusting modification of the at least one element based on the ratio of change of the at least one element.

In one or more embodiments, the object in the video to be retouched is a human face.

In one or more embodiments, calculating new parameters of the at least one element includes: detecting parts of the human face which are selected based on the request for retouching; calculating new parameters for the selected parts of the human face to make the parts of the human face be symmetrical relative to the central axis of the human face.

In one or more embodiments, the computer implemented method further comprises: creating a square grid associated with a background of the human face in the video; and transforming the background of the human face using the square grid to achieve blurring of the background.

BRIEF DESCRIPTION OF DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION OF THE INVENTION

Figure 1:
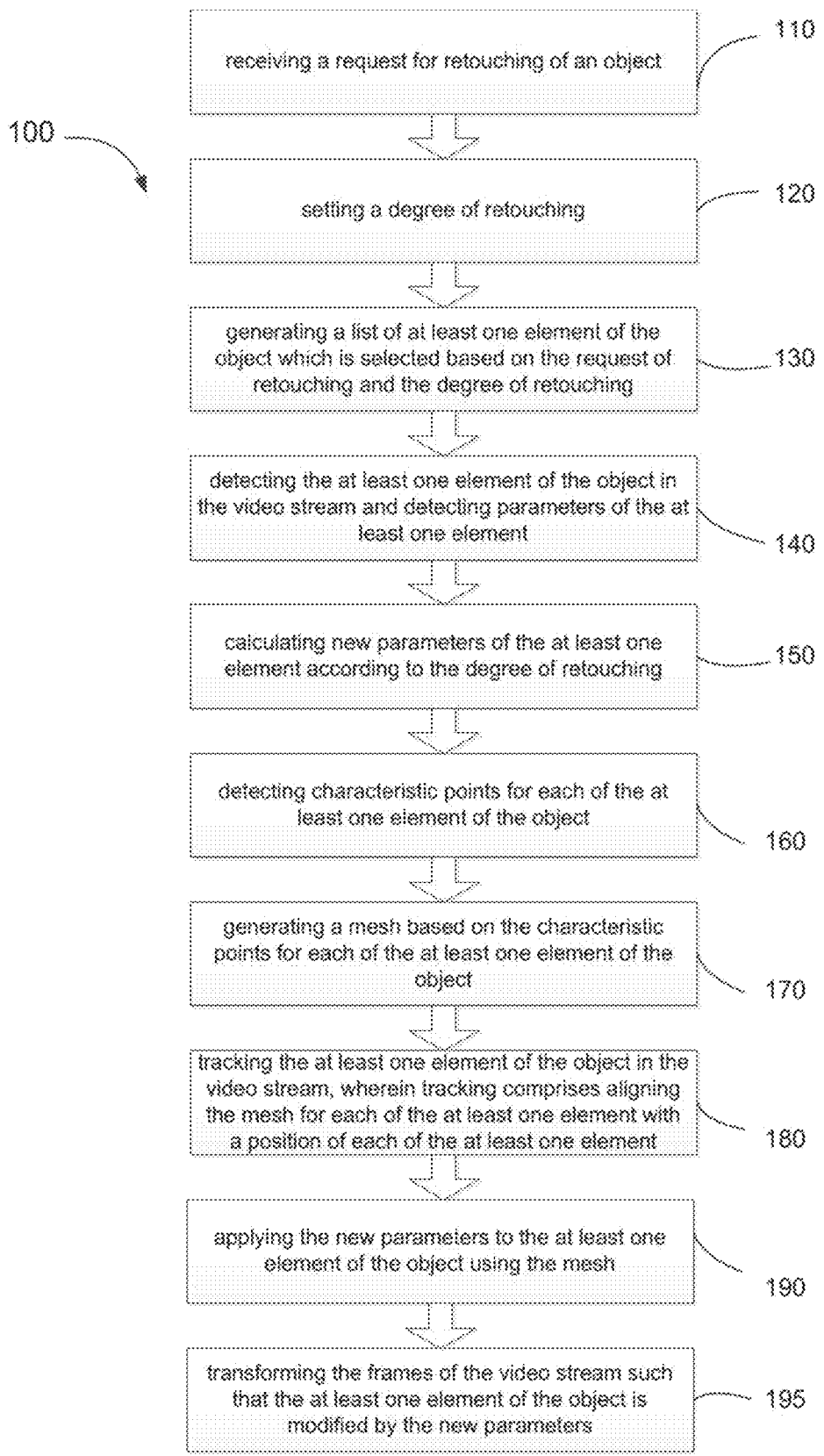
FIG. 1 illustrates a method of real-time video processing for retouching an object in a video according to the first embodiment of the invention.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

It will be appreciated that the method for real time video processing can be performed with any kind of video data, e.g. video streams, video files saved in a memory of a computerized system of any kind (such as mobile computer devices, desktop computer devices and others), and all other possible types of video data understandable for those skilled in the art. Any kind of video data can be processed, and the embodiments disclosed herein are not intended to be limiting the scope of the present invention by indicating a certain type of video data.

In accordance with one aspect of the embodiments described herein, there are provided a computerized system and a computer-implemented method for real-time video processing involving retouching an object in a video.

The techniques described herein can be implemented using any type of computing device including desktops, laptops, tablet computers, mobile phones, music players, multimedia players etc. having any kind of generally used operational system such as Windows®, iOS®, Android® and others. All disclosed embodiments and examples are non-limiting to the invention and disclosed for illustrative purposes only.

The embodiments disclosed further are aimed for processing of video streams, however all other types of video data including video files saved in a memory of a computerized system can be processed by the methods of the present invention. For example, a user can load video files and save them in a memory of his computerized system and such video files can be also processed by the methods of the present invention.

An exemplary method 100 of real-time video stream processing for retouching an object in a video stream according to the first embodiment of the invention (FIG. 1) is used for an object in a video stream that least partially and at least occasionally presented in frames of the video stream. The method 100 starts with receiving a request for retouching of an object (stage 110) and setting a degree of retouching (stage 120). It shall be noted that the request for retouching and the degree of retouching can be generated automatically by a system or a device implementing this method, or manually by a user. Then, a list of at least one element of the object is generated (stage 130) such that the elements are selected for the list based on the request of retouching and the degree of retouching. It means that number and nature of the elements from the list depends on the request of retouching and the degree of retouching. Further, the elements of the object from the list and their parameters are detected in the video stream (stage 140). The parameters of the elements can include their location, shape, color, and also properties of a covering layer if it is present. Then, new parameters of the elements are calculated according to the degree of retouching (stage 150).

In one or more embodiments, the following stages of the method 100 are aimed for using the new parameters of the elements to transform the frames of the video stream. In particular, characteristic points are detected for each element of the object at stage 160 and a mesh based on the characteristic points for each element of the object is generated at stage 170. The term "characteristic points" shall be understood in the present disclosure as points of the elements which are used for transforming frames of a video stream. The method 100 continues with tracking the elements of the object in the video stream (stage 180). Such tracking includes aligning the mesh for each element with a position of that element. Finally, the new parameters are applied to the elements of the object using the mesh (stage 190) and the elements of the object are modified by the new parameters, thus transforming the frames of the video stream (stage 195).

In one or more embodiments, applying of the new parameters at stage 190 can be performed in different ways. According to one of the embodiments of the invention applying of the new parameters is aimed to change locations of the object's elements and includes the following stages. A set of first points is generated on the mesh for each element of the object based on the actual location of the element; and a set of second points is generated on the mesh based on the request for retouching. Finally, locations of the elements of the object are changed in accordance with the set of first points and the set of second points. Here, to avoid distortion of surrounding area which surrounds the elements, the surrounding area is also modified.

In one or more embodiments, applying of the new parameters is aimed to change proportions of the object's elements and includes the following stages. A set of first points is generated on the mesh for each element of the object based on the degree of retouching; and a set of second points is generated on the mesh based on the set of first points and the degree of retouching. Then, proportions of the elements of the object are changed in accordance with the degree of retouching and the sets of first and second points.

In one or more embodiments, it is also possible when applying of the new parameters is performed to change colors of the objects' elements. In this case a set of first points is generated on the mesh for each element of the object based on the degree of retouching, and at least one area is generated on the basis of the set of first points mesh for each of the at least one element of the object. Colors of the at least one area are changed based on the degree of retouching.

In some embodiments applying of the new parameters involves using a covering layer, which covers certain areas on an object to be retouched. More specifically, applying of the new parameters in this case includes generating of a set of first points on the mesh for each element of the object based on the degree of retouching and generating a covering layer based on the set of first points and calculated new parameters for element of the object. Finally, the generated covering layer is applied for each one area based on the degree of retouching.

In one or more embodiments, it is possible to reduce calculations in the present invention by analyzing changes of an object in several successive frames. For example, transforming of frames of the video stream can further include scanning the elements of the object in at least two successive frames and generating a ratio of change of the elements of the object. The generated ratio of change is then used to adjust modification of the elements.

As would be understood by those skilled in the art, an object in the video stream chosen to be retouched can be a human face. In this case, according to one of the embodiments of the inventions, stage 150 of calculating new parameters of the at least one element includes detecting parts of a human face to be retouched which are selected based on the request for retouching; and calculating new parameters for the parts of the human face to make those parts be symmetrical relative to the central axis of the human face.

Also the following blurring effect for a human face as an object can be used. Here, the method according to the present invention also comprises creating a square grid associated with a background of a human face in the video stream; and transforming the background of the human face using the square grid to achieve blurring of the background.

In one or more embodiments, Retouching can be also performed using a common covering layer for an object in the video stream. Such method 200 for retouching an object in a video stream according to the second embodiment of the invention is illustrated in FIG. 1. First, a request for retouching of an object which is at least partially and at least occasionally presented in frames of the video stream is received (stage 210). Then, the method 200 includes setting a degree of retouching (stage 220). Next, an average image of the object is generated based on a plurality of frames of the video stream and feature reference points of the object are detected (stage 230). The average image of the object can be generated at least several frames of the video stream. The average object and the feature reference points are used for generating a covering layer and its aligning with the object as mentioned below. Further, a list of at least one element of the object which is selected based on the request of retouching and the degree of retouching is generated (stage 240); and the at least one element of the object and parameters of the at least one element are detected (stage 250). Next, new parameters of the at least one element are calculated according to the degree of retouching (stage 255); and characteristic points for each of the at least one element of the object are calculated (stage 260). The method 200 further includes generating a first mesh based on the characteristic points for each of the at least one element of the object (stage 265), and generating a covering layer based on the average image of the object and the calculated new parameters of the at least one element (stage 270). It shall be noted that the covering layer comprises the average image with the at least one element of the object modified by the new parameters using the first mesh. Further, the feature reference points of the object are tracked (stage 275). Here, tracking includes creating of a second mesh that is based on the positions of feature reference points of the object, and aligning the second mesh to the object in each frame. Finally, the method 200 includes transforming the covering layer based on the second mesh in each frame (stage 280), aligning the covering layer with the object using the second mesh (stage 285), and transforming the frames of the video stream such that the object is covered by the covering layer in each frame (stage 290).

Face detection and face tracking techniques are discussed in greater detail below.

Face Detection and Initialization

In one or more embodiments, first in the algorithm for changing proportion a user sends a request for changing proportions of an object in a video stream. The next step in the algorithm involves detecting the object in the video stream.

In one or more embodiments, the face is detected on an image with use of Viola-Jones method. Viola-Jones method is a fast and quite accurate method used to detect the face region. Then, an Active Shape Model (ASM) algorithm is applied to the face region of an image to detect facial feature reference points. However, it should be appreciated that other methods and algorithms suitable for face detection can be used.

Figure 2:
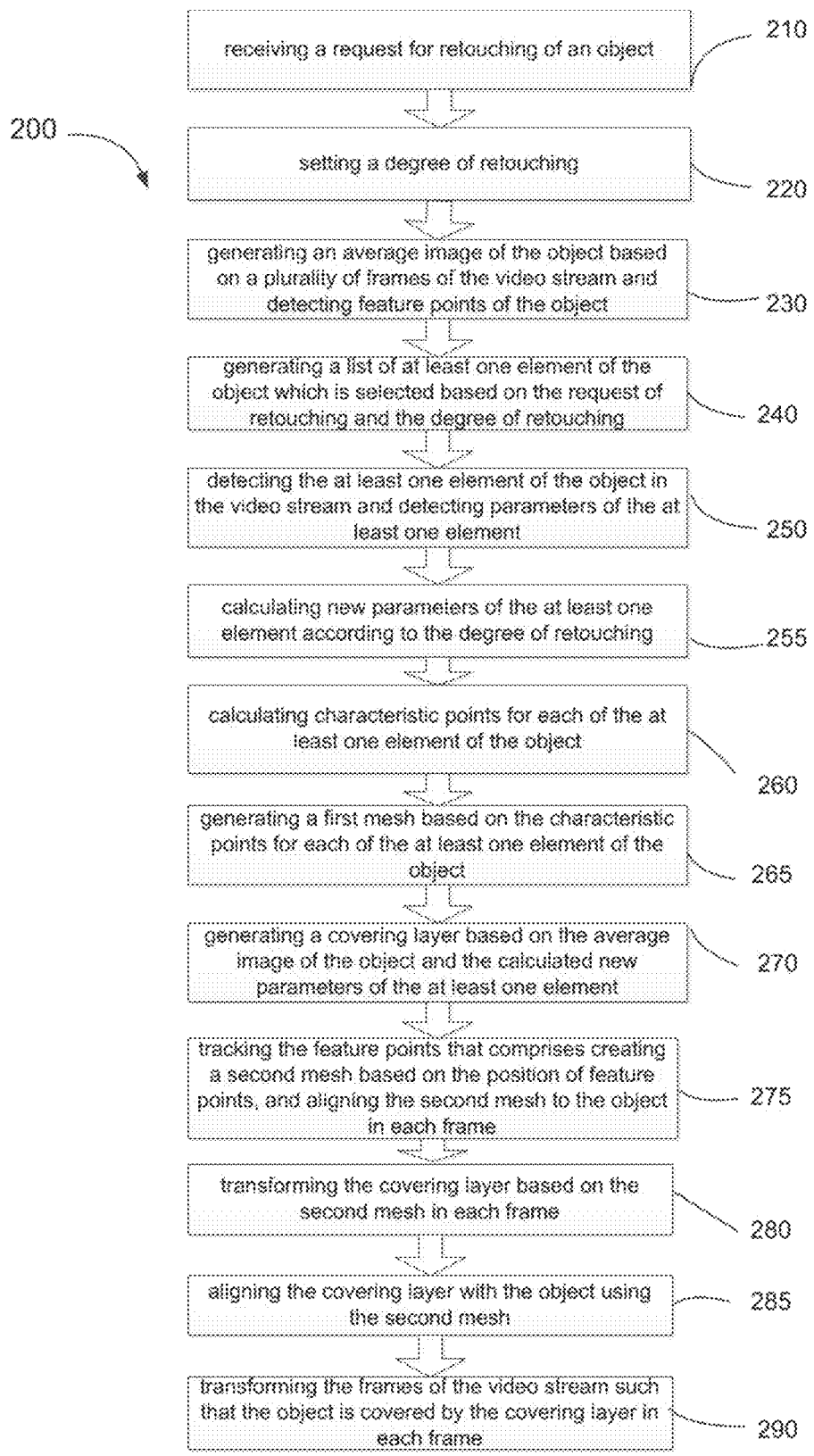
FIG. 2 illustrates a method of real-time video processing for retouching an object in a video according to the second embodiment of the invention.

In one or more embodiments, for locating facial features locating of landmarks is used. A landmark represents a distinguishable point present in most of the images under consideration, for example, the location of the left eye pupil (FIG. 2).

In one or more embodiments, s set of landmarks forms a shape. Shapes are represented as vectors: all the x- followed by all the y-coordinates of the points in the shape. One shape is aligned to another with a similarity transform (allowing translation, scaling, and rotation) that minimizes the average Euclidean distance between shape points. The mean shape is the mean of the aligned training shapes (which in the present disclosure are manually landmarked faces).

Subsequently, in accordance with the ASM algorithm, the search for landmarks from the mean shape aligned to the position and size of the face determined by a global face detector is started. It then repeats the following two steps until convergence (i) suggest a tentative shape by adjusting the locations of shape points by template matching of the image texture around each point (ii) conform the tentative shape to a global shape model. The individual template matches are unreliable and the shape model pools the results of the weak template matchers to form a stronger overall classifier. The entire search is repeated at each level in an image pyramid, from coarse to fine resolution. It follows that two types of submodel make up the ASM: the profile model and the shape model.

In one or more embodiments, the profile models (one for each landmark at each pyramid level) are used to locate the approximate position of each landmark by template matching. Any template matcher can be used, but the classical ASM forms a fixed-length normalized gradient vector (called the profile) by sampling the image along a line (called the whisker) orthogonal to the shape boundary at the landmark. During training on manually landmarked faces, at each landmark the mean profile vector $\bar{g}$ and the profile covariance matrix $S_g$ are calculated. During searching, the landmark along the whisker to the pixel whose profile $g$ has lowest Mahalanobis distance from the mean profile $\bar{g}$ is displaced, where the $$\text{MahalanobisDistance} = (g-\bar{g})^T S_g^{-1}(g-\bar{g}). \tag{1}$$

In one or more embodiments, the shape model specifies allowable constellations of landmarks. It generates a shape x̂ with $$\hat{x} = \bar{x} + \phi b \quad (2)$$

where x̂ (is the mean shape, is a parameter vector, and is a matrix of selected eigenvectors of the covariance matrix Sg of the points of the aligned training shapes. Using a standard principal components approach, model has as much variation in the training set as it is desired by ordering the eigenvalues λi of Ss and keeping an appropriate number of the corresponding eigenvectors in φ. In the method is used a single shape model for the entire ASM but it is scaled for each pyramid level.

Subsequently, the Equation 2 is used to generate various shapes by varying the vector parameter b. By keeping the elements of b within limits (determined during model building) it is possible to ensure that generated face shapes are lifelike.

Conversely, given a suggested shape x, it is possible to calculate the parameter b that allows Equation 2 to best approximate x with a model shape x^. An iterative algorithm, described by Cootes and Taylor, that gives the b and T that minimizes $$\text{distance}(x, T(\bar{x} + \phi b)) \quad (3)$$

where T is a similarity transform that maps the model space into the image space is used.

In one or more embodiments, mapping can be built from facial feature reference points, detected by ASM, to Candide-3 point, and that gives us Candide-3 points x and y coordinates. Candide is a parameterized face mask specifically developed for model-based coding of human faces. Its low number of polygons (approximately 100) allows fast reconstruction with moderate computing power. Candide is controlled by global and local Action Units (AUs). The global ones correspond to rotations around three axes. The local Action Units control the mimics of the face so that different expressions can be obtained.

The following equation system can be made, knowing Candide-3 points x and y coordinates.

$$\sum_{j=1}^{m} X_{ij} * B_j = x_i, \quad (4)$$

$$\sum_{j=1}^{m} Y_{ij} * B_j = y_i, \quad (5)$$

where Bj—j-th shape unit, xi, yi—i-th point coordinates, Xij, Yij—coefficients, which denote how the i-th point coordinates are changed by j-th shape unit. In this case, this system is over determined, so it can be solved precisely. Thus, the following minimization is made:

$$\left(\sum_{j=1}^{m} X_{ij} * B_j - x_i\right)^2 + \left(\sum_{j=1}^{m} Y_{ij} * B_j - y_i\right)^2 \to \min \quad (6)$$

Let's denote $$X = (X_{ij})^T, (Y_{ij})^T)^T, x = ((x_i)^T, (y_i)^T)^T, = (B_j)^T. \quad (7)$$

This equation system is linear, so its solution is $$B = (X^T X)^{-1} X^T x \quad (8)$$

In one or more embodiments, it is also possible to use Viola-Jones method and ASM to improve tracking quality. Face tracking methods usually accumulate error over time, so they can lose face position after several hundred frames. In order to prevent it, in the present invention the ASM algorithm is run from time to time to re-initialize tracking algorithm.

Face Tracking

Figure 3:
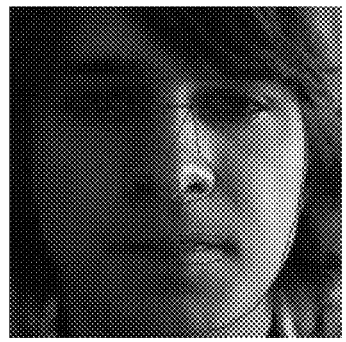
FIG. 3 illustrates facial feature reference points detected by an ASM algorithm used in the method according to one embodiment of the present invention.
Figure 3:
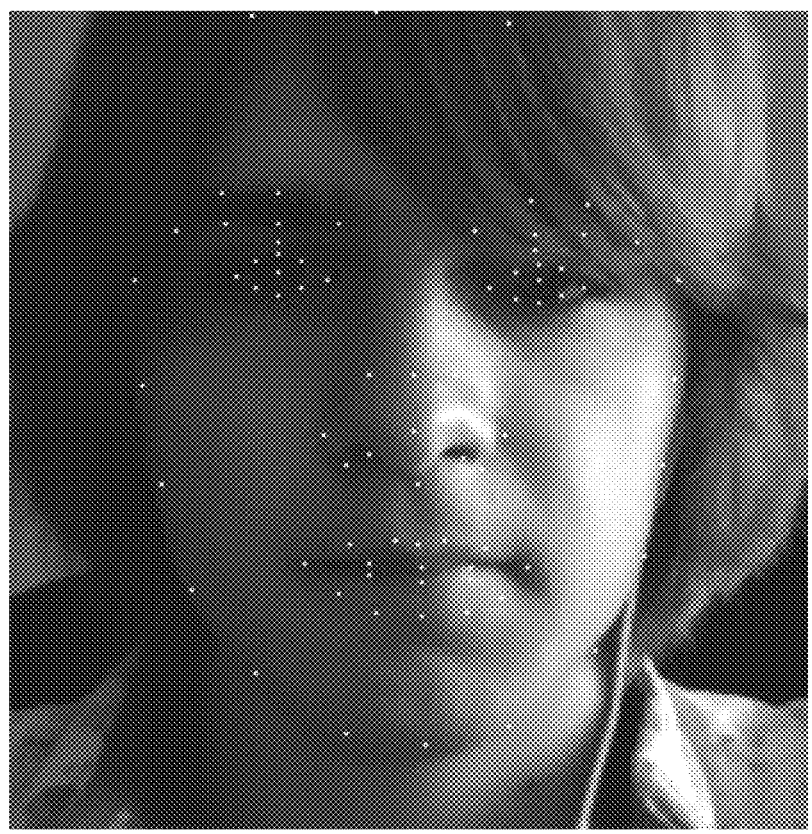
Figure 4:
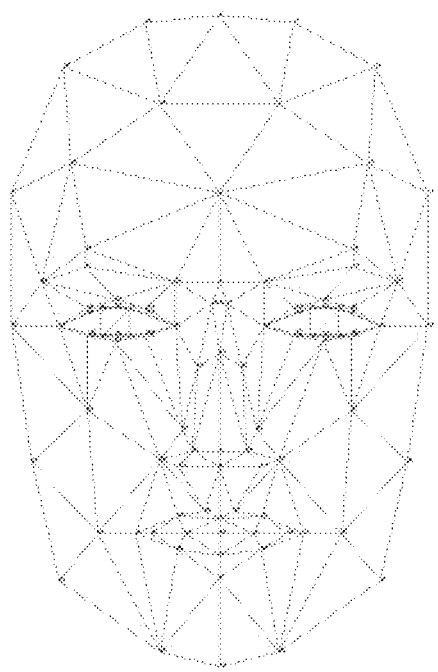
FIG. 4 illustrates Candide-3 model used in the method according to one embodiment of the present invention.

In one or more embodiments, the next step comprises tracking the detected object in the video stream. In the present invention the abovementioned Candide-3 model is used (see Ahlberg, J.: Candide-3, an updated parameterized face. Technical report, Linköping University, Sweden (2001)) for tracking face in a video stream. The mesh or mask corresponding to Candide-3 model is shown in FIG. 3.

Figure 5A:
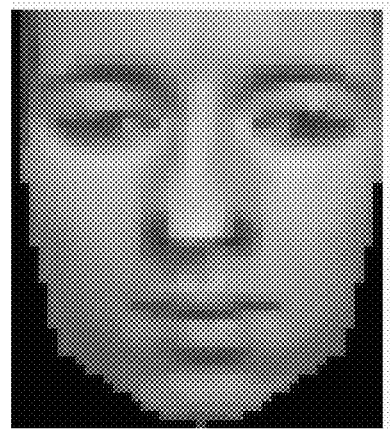
FIG. 5(a) and FIG. 5(b) show an example of a mean face (a) and an example of current observation.
Figure 5B:
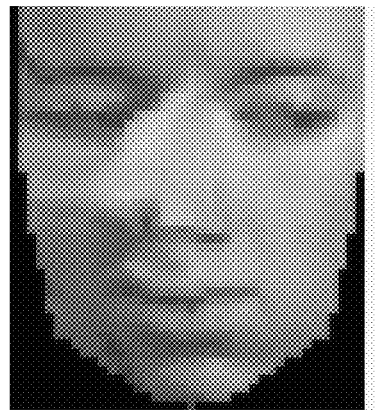
Figure 6:
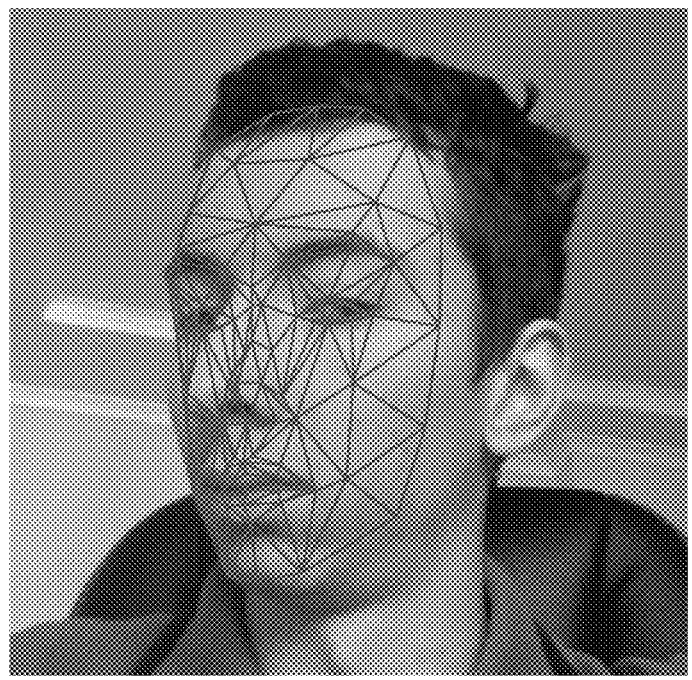
FIG. 6 illustrates Candide at a frame used in the method according to one embodiment of the present invention.

In one or more embodiments, a state of the model can be described by shape units intensity vector, action units intensity vector and a position-vector. Shape units are some main parameters of a head and a face. In the present invention the following 10 units are used:

Eyebrows vertical position
Eyes vertical position
Eyes width
Eyes height
Eye separation distance
Nose vertical position
Nose pointing up
Mouth vertical position
Mouth width
Chin width In one or more embodiments, action units are face parameters that correspond to some face movement. In the present invention the following 7 units are used:

Upper lip raiser
Jaw drop
Lip stretcher
Left brow lowerer
Right brow lowerer
Lip corner depressor
Outer brow raiser In one or more embodiments, the mask position at a picture can be described using 6 coordinates: yaw, pitch, roll, x, y, scale. The main idea of the algorithm proposed by Dornaika et al. (Dornaika, F., Davoine, F.: On appearance based face and facial action tracking. IEEE Trans. Circuits Syst. Video Technol. 16(9):1107-1124 (2006)) is to find the mask position, which observes the region most likely to be a face. For each position it is possible to calculate observation error—the value which indicates the difference between image under current mask position and the mean face. An example of the mean face and of the observation under current position is illustrated in FIGS. 5(a)-5(b) corresponds to the observation under the mask shown in FIG. 6.

In one or more embodiments, face is modeled as a picture with a fixed size (width=40 px, height=46 px) called a mean face. Gaussian distribution that proposed in original algorithms has shown worse result in comparison with static image. So the difference between current observation and a mean face is calculated in the following way:

$$e(b) = \Sigma ( (\log(1+I_m) - \log(1+I_i))^2 \quad (9)$$

Logarithm function makes tracking more stable.

In one or more embodiments, to minimize error Taylor series is used as it was proposed by Dornaika at. el. (see F. Dornaika, F. Davoine, On appearance based face and facial action tracking, in IEEE Transactions on Circuits and Systems for Video Technology, 16(9), September, 2006, p.

1107-1124). It was found that it is not necessary to sum up a number of finite differences when calculating an approximation to first derivative. Derivative is calculated in the following way:

$$g_{ij} = \frac{W(y_t, b_t + \_b_t)_{ij} - W(y_t, b_t + \_b_t)_{ij}}{-j} \quad (10)$$

Here $g_{ij}$ is an element of matrix G. This matrix has size m*n, where m is large enough (about 1600) and n is small (about 14). In case of straight-forward calculating there have to be done n*m operations of division, To reduce the number of divisions this matrix can be rewritten as a product of two matrices:

$$G = A*B$$

Where matrix A has the same size as G and its element is:

$$a_{ij} = W(y_t, b_t + \_b_t)_{ij} - W(y_t, b_t \_b_t)_{ij} \quad (11)$$

and matrix B is a diagonal matrix with sizes n*n, and $b_{ii} = \_i^{-1}$

Now Matrix $G_t^+$ has to be obtained and here is a place where a number of divisions can be reduced.

$$G_t^+(G^TG)^{-1}G^T = (B_TA^TAB)^{-1}B^TA^T = B^{-1}(A^TA)^{-1}B^{-1}BA^T = B^{-1}(A^TA)^{-1}A^T \quad (12)$$

After that transformation this can be done with n*n divisions instead of m*n.

One more optimization was used here. If matrix G is created and then multiplied to $\Box b_t$ it leads to $n^2m$ operations, but if first $A^T$ and $\Box b_t$ are multiplied and then $B^{-1}(A^TA)^{-1}$ with it, there will be only $n*m+n^3$ operations, that is much better because n<<m.

Thus, the step of tracking the detected object in the video stream in the present embodiment comprises creating a mesh that is based on the detected feature reference points of the object and aligning the mesh to the object on each frame.

It should be also noted that to increase tracking speed in the present invention multiplication of matrices is performed in such a way, that it can be boosted using ARM advanced SIMD extensions (also known as NEON). Also, the GPU is used instead of CPU whenever possible. To get high performance of the GPU operations in the present invention are grouped in a special way.

Thus, tracking according to an exemplary embodiment of the invention has the following advantageous features:
1. Before tracking Logarithm is applied to the grayscale value of each pixel to track it. This transformation has a great impact to tracking performance.
2. In the procedure of gradient matrix creation, the step of each parameter depends on the scale of the mask.

Exemplary Computer Platform

Figure 7:
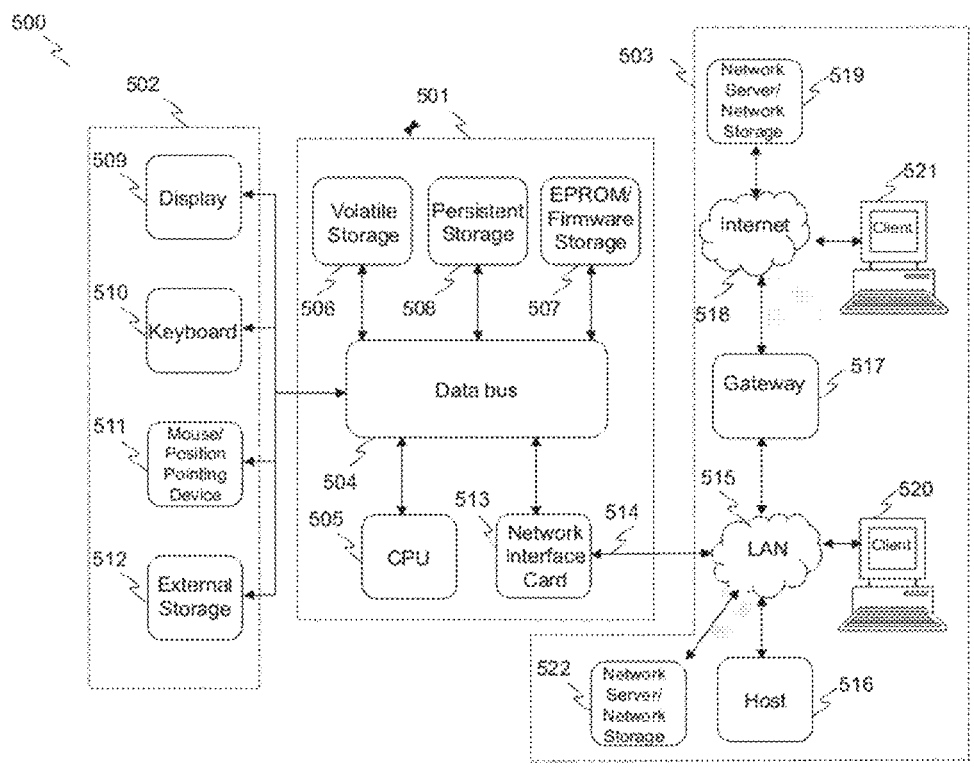
FIG. 7 illustrates an exemplary embodiment of a computer platform based on which the techniques described herein may be implemented.

FIG. 7 is a block diagram that illustrates an embodiment of a computer system 500 upon which various embodiments of the inventive concepts described herein may be implemented. The system 500 includes a computer platform 501, peripheral devices 502 and network resources 503.

The computer platform 501 may include a data bus 504 or other communication mechanism for communicating information across and among various parts of the computer platform 501, and a processor 505 coupled with bus 504 for processing information and performing other computational and control tasks. Computer platform 501 also includes a volatile storage 506, such as a random access memory (RAM) or other dynamic storage device, coupled to bus 504 for storing various information as well as instructions to be executed by processor 505, including the software application for implementing multifunctional interaction with elements of a list using touch-sensitive devices described above. The volatile storage 506 also may be used for storing temporary variables or other intermediate information during execution of instructions by processor 505. Computer platform 501 may further include a read only memory (ROM or EPROM) 507 or other static storage device coupled to bus 504 for storing static information and instructions for processor 505, such as basic input-output system (BIOS), as well as various system configuration parameters. A persistent storage device 508, such as a magnetic disk, optical disk, or solid-state flash memory device is provided and coupled to bus 504 for storing information and instructions.

Computer platform 501 may be coupled via bus 504 to a touch-sensitive display 509, such as a cathode ray tube (CRT), plasma display, or a liquid crystal display (LCD), for displaying information to a system administrator or user of the computer platform 501. An input device 510, including alphanumeric and other keys, is coupled to bus 504 for communicating information and command selections to processor 505. Another type of user input device is cursor control device 511, such as a mouse, a trackball, or cursor direction keys for communicating direction information and command selections to processor 505 and for controlling cursor movement on touch-sensitive display 509. This input device typically has two degrees of freedom in two axes, a first axis (e.g., x) and a second axis (e.g., y), that allows the device to specify positions in a plane. To detect user's gestures, the display 509 may incorporate a touchscreen interface configured to detect user's tactile events and send information on the detected events to the processor 505 via the bus 504.

An external storage device 512 may be coupled to the computer platform 501 via bus 504 to provide an extra or removable storage capacity for the computer platform 501. In an embodiment of the computer system 500, the external removable storage device 512 may be used to facilitate exchange of data with other computer systems.

The invention is related to the use of computer system 500 for implementing the techniques described herein. In an embodiment, the inventive system may reside on a machine such as computer platform 501. According to one embodiment of the invention, the techniques described herein are performed by computer system 500 in response to processor 505 executing one or more sequences of one or more instructions contained in the volatile memory 506. Such instructions may be read into volatile memory 506 from another computer-readable medium, such as persistent storage device 508. Execution of the sequences of instructions contained in the volatile memory 506 causes processor 505 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 505 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as the persistent storage device 508. Volatile media includes dynamic memory, such as volatile storage 506.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 505 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 504. The bus 504 carries the data to the volatile storage 506, from which processor 505 retrieves and executes the instructions. The instructions received by the volatile memory 506 may optionally be stored on persistent storage device 508 either before or after execution by processor 505. The instructions may also be downloaded into the computer platform 501 via Internet using a variety of network data communication protocols well known in the art.

The computer platform 501 also includes a communication interface, such as network interface card 513 coupled to the data bus 504. Communication interface 513 provides a two-way data communication coupling to a network link 514 that is coupled to a local network 515. For example, communication interface 513 may be an integrated services digital network (ISDN) card or a modem to provide a data communication connection to a corresponding type of telephone line. As another example, communication interface 513 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 513 sends and receives electrical, electromagnetic or optical signals that carry digital data streams representing various types of information.

Network link 514 typically provides data communication through one or more networks to other network resources. For example, network link 514 may provide a connection through local network 515 to a host computer 516, or a network storage/server 522, Additionally or alternatively, the network link 514 may connect through gateway/firewall 517 to the wide-area or global network 518, such as an Internet. Thus, the computer platform 501 can access network resources located anywhere on the Internet 518, such as a remote network storage/server 519. On the other hand, the computer platform 501 may also be accessed by clients located anywhere on the local area network 515 and/or the Internet 518. The network clients 520 and 521 may themselves be implemented based on the computer platform similar to the platform 501.

Local network 515 and the Internet 518 both use electrical, electromagnetic or optical signals that carry digital data streams. The signals through the various networks and the signals on network link 514 and through communication interface 513, which carry the digital data to and from computer platform 501, are exemplary forms of carrier waves transporting the information.

Computer platform 501 can send messages and receive data, including program code, through the variety of network(s) including Internet 518 and LAN 515, network link 515 and communication interface 513. In the Internet example, when the system 501 acts as a network server, it might transmit a requested code or data for an application program running on client(s) 520 and/or 521 through the Internet 518, gateway/firewall 517, local area network 515 and communication interface 513. Similarly, it may receive code from other network resources.

The received code may be executed by processor 505 as it is received, and/or stored in persistent or volatile storage devices 508 and 506, respectively, or other non-volatile storage for later execution.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and fir are will be suitable for practicing the present invention. For example, the described software may be implemented in a wide variety of programming or scripting languages, such as Assembler, C/C++, Objective-C, pert, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for real time video stream processing. It is intended that the specification and examples be considered as exemplary only, with a true scope and spirit of the invention being indicated by the following claims.

What is claimed is:

1. A computer-implemented method comprising:
   receiving a video stream depicting an object;
   generating a request for retouching the object depicted in the received video stream;
   determining that a covering layer is present in the video stream that covers an area of the object depicted in a reference video frame of the video stream;
   obtaining one or more properties of the covering layer;
   detecting an element of the object and a corresponding parameter of the element, the parameter comprising the one or more properties of the covering layer;
   obtaining a current observation of the object using the video stream;
   determining a mean face corresponding to the object; and
   computing an observation error based on a square of a difference between a logarithm of a function of the current observation of the object and the logarithm of the function of the mean face, the element of the object being detected based on the observation error;
   after determining that the covering layer is presented in the video stream, based on detecting the element of the object and the corresponding parameter that comprises the one or more properties of the covering layer, calculating a new parameter for the detected element of the object according to the request for retouching;

modifying the element of the object depicted in the reference video frame based on the new parameter, the modifying comprising:

generating an average image of the object based on a plurality of frames of the video stream;

modifying the element of the object in the average image based on the calculated new parameter for the element;

generating a given covering layer comprising the average image with the element of the object modified based on the calculated new parameter; and aligning the given covering layer, that includes the average image with the modified element, with the object depicted in the video stream to cover the object in each frame of the video stream; and presenting the modified element of the object in the video stream.

2. The computer-implemented method of claim 1, further comprising:

generating a list of elements depicted in the video stream, the list of elements comprising the element of the object, the list of elements selected based on the request for retouching and a degree of retouching; and detecting the element of the object in the video stream and parameters of the element.

3. The computer-implemented method of claim 1, further comprising:

detecting characteristic points for the element of the object;

generating a mesh based on the characteristic points for the element of the object;

tracking the element of the object in the video stream by aligning the mesh for the element with a position of the element;

generating a square grid associated with a background of the object in the video stream; and transforming frames of the video stream to generate modified frames within the video stream such that the background of the object is blurred using the square grid and such that the element of the object is modified.

4. The computer-implemented method of claim 1, further comprising:

generating a set of first points on a mesh for the element of the object based on the request for retouching;

generating a set of second points on the mesh based on the set of first points and the request for retouching; and changing proportions of the element of the object in accordance with the request for retouching, the set of first points, and the set of second points, wherein the set of first points comes into the set of second points using the mesh.

5. The computer-implemented method of claim 1, further comprising:

calculating the new parameter for the detected element of the objected covered by the covering layer based on the one or more properties of the covering layer.

6. The computer-implemented method of claim 1, further comprising:

generating a set of first points on a mesh for the element of the object based on the request for retouching;

generating the covering layer based on the set of first points; and applying the generated covering layer to the element of the object based on the request for retouching.

7. The computer-implemented method of claim 1, further comprising:

scanning the element of the object in at least two successive frames;

generating a ratio of change of the element of the object; and adjusting modification of the element based on the ratio of change.

8. The computer-implemented method of claim 1, wherein the object in the video stream to be retouched comprises a human face.

9. The computer-implemented method of claim 8, further comprising:

detecting parts of the human face which are selected based on the request for retouching;

calculating new parameters for the selected parts of the human face;

transforming visual depiction of the parts of the human face in the video stream to be symmetrical relative to a central axis of the human face based on the calculated new parameters.

10. The computer-implemented method of claim 1, wherein the object is detected based on an eye separation distance, a mouth width, a chin width and action unit information indicating a jaw drop and lip corner depression.

11. A system, comprising:

one or more processors; and a non-transitory processor-readable storage medium coupled to the one or more processors, the non-transitory processor-readable storage medium storing processor executable instructions that, when executed by the one or more processors, cause the one or more processors to perform operations comprising:

receiving a video stream depicting an object;

generating a request for retouching the object depicted in the received video stream;

determining that a covering layer is present in the video stream that covers an area of the object depicted in a reference video frame of the video stream;

obtaining one or more properties of the covering layer;

detecting an element of the object and a corresponding parameter of the element, the parameter comprising the one or more properties of the covering layer;

obtaining a current observation of the object using the video stream;

determining a mean face corresponding to the object; and computing an observation error based on a square of a difference between a logarithm of a function of the current observation of the object and the logarithm of the function of the mean face, the element of the object being detected based on the observation error;

after determining that the covering layer is presented in the video stream, based on detecting the element of the object and the corresponding parameter that comprises the one or more properties of the covering layer, calculating a new parameter for the detected element of the object according to the request for retouching;

modifying the element of the object depicted in the reference video frame based on the new parameter, the modifying comprising:

generating an average image of the object based on a plurality of frames of the video stream;

modifying the element of the object in the average image based on the calculated new parameter for the element;

generating a given covering layer comprising the average image with the element of the object modified based on the calculated new parameter; and aligning the given covering layer, that includes the average image with the modified element, with the object depicted in the video stream to cover the object in each frame of the video stream; and presenting the modified element of the object in the video stream.

12. The computer-implemented method of claim 1, further comprising:

initializing a tracking process to detect the object in the video stream; and from time to time, re-initializing the tracking process to re-detect the object in the video stream to continue modifying the element.

13. The computer-implemented method of claim 12, wherein the tracking process comprises an Active Shape Model (ASM).

14. The computer-implemented method of claim 1, further comprising:

obtaining grayscale values of each pixel of the object in the video;

applying a logarithm to the grayscale values of each pixel of the object in the video before tracking the object; and tracking the object in the video based on the logarithm of the grayscale values.

15. The computer-implemented method of claim 1, further comprising:

training a parametrized model to detect a face using a set of training data comprising training shapes, the training shapes corresponding to manually landmarked faces, wherein during training at each landmark a mean profile vector and a profile covariance matrix are calculated.

16. The system of claim 11, wherein the operations further comprise:

generating a set of first points on a mesh for the element of the object based on the request for retouching;

generating the covering layer based on the set of first points; and applying the generated covering layer to the element of the object based on the request for retouching.

17. The system of claim 11, wherein the operations further comprise:

scanning the element of the object in at least two successive frames;

generating a ratio of change of the element of the object; and adjusting modification of the element based on the ratio of change.

18. The system of claim 11, wherein the object is detected based on a shape units intensity vector, an action units intensity vector and a position vector, the position vector indicating vertical positions of eyebrows, eyes, nose and mouth, the position vector further indicating widths of eyes, mouth and chin, the action units intensity vector indicating facial movement comprising upper lip raising, lip stretching, brow rising, and brow lowering.

19. A non-transitory processor-readable storage medium storing processor executable instructions that, when executed by a processor of a machine, cause the machine to perform operations comprising:

receiving a video stream depicting an object;

generating a request for retouching the object depicted in the received video stream;

determining that a covering layer is present in the video stream that covers an area of the object depicted in a reference video frame of the video stream;

obtaining one or more properties of the covering layer;

detecting an element of the object and a corresponding parameter of the element, the parameter comprising the one or more properties of the covering layer;

obtaining a current observation of the object using the video stream;

determining a mean face corresponding to the object; and computing an observation error based on a square of a difference between a logarithm of a function of the current observation of the object and the logarithm of the function of the mean face, the element of the object being detected based on the observation error;

after determining that the covering layer is presented in the video stream, based on detecting the element of the object and the corresponding parameter that comprises the one or more properties of the covering layer, calculating a new parameter for the detected element of the object according to the request for retouching;

modifying the element of the object depicted in the reference video frame based on the new parameter, the modifying comprising:

generating an average image of the object based on a plurality of frames of the video stream;

modifying the element of the object in the average image based on the calculated new parameter for the element;

generating a given covering layer comprising the average image with the element of the object modified based on the calculated new parameter; and aligning the given covering layer, that includes the average image with the modified element, with the object depicted in the video stream to cover the object in each frame of the video stream; and presenting the modified element of the object in the video stream.

* * * * *